Nov. 27, 1951 J. GREAVES 2,576,756
SEEDER ATTACHMENT
Filed Aug. 26, 1948
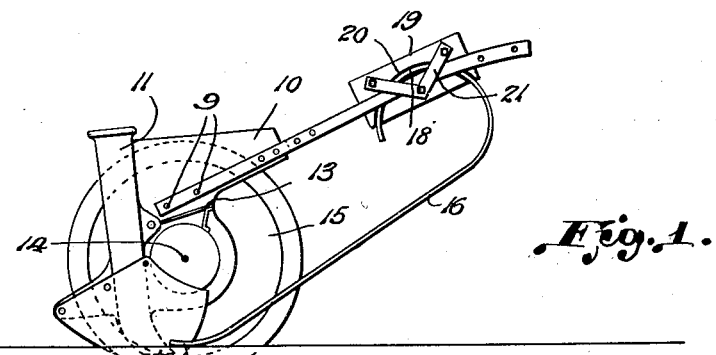
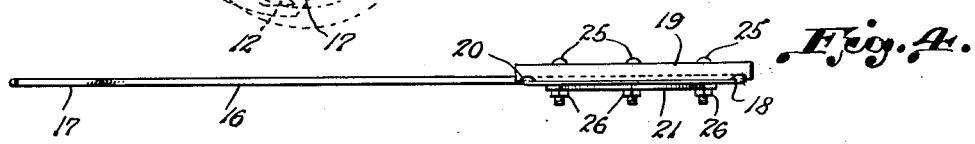
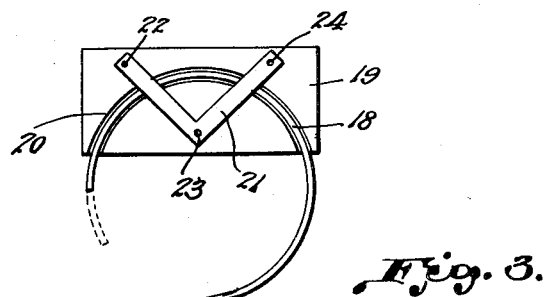
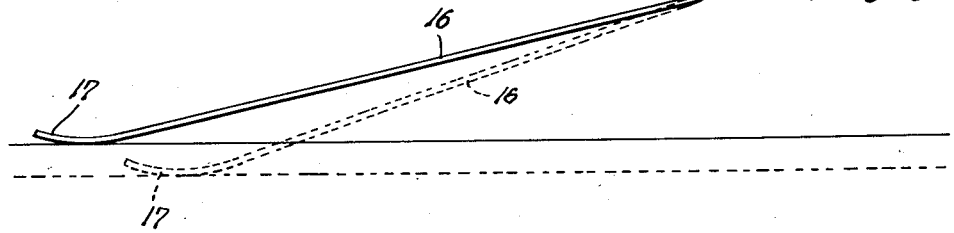
Inventor,
Joseph Greaves
By Geo. A. Tew
ATTORNEY.

Patented Nov. 27, 1951

2,576,756

UNITED STATES PATENT OFFICE 2,576,756

SEEDER ATTACHMENT

Joseph Greaves, Toston, Mont.

Application August 26, 1948, Serial No. 46,289

1 Claim. (Cl. 97—190)

This invention relates to an attachment for disc seeders and grain drills and consists of a substantially stiff rod for attachment to the draw bar of a disc seeder or grain drill to provide a clearance and depth gage for the seeder or drill.

The main object of the invention is to provide a rather stiff spring rod, or a flat spring runner-like member which can be attached to the draw bar of the disc seeder or the like, the spring runner being adjustable to different positions above the ground level and thereby regulate the distance or depth that the disc is allowed to sink into the ground. Such an attachment produces for a much more even depth of seed planting during a seeding operation and therefore produces a more regular stand after the seed germinates, because the seed is all placed a predetermined distance below the surface of the ground as determined by the set of the spring gage. Thus, it will be seen, that if the disc should hit a soft spot in the land the spring gage would engage the ground and prevent the same from going too far into the ground.

A further object of the invention is to provide such a spring gage which during its operation in connection with the disc seeder will keep weeds and stubble from pushing ahead and thus plugging the grain feeding spouts and discs, this being due to the fact that the gage rides substantially in a position beside the disc and seed shoe or spout and holds down stubble and vegetation as the seed is being dropped.

The invention is illustrated in the accompanying drawings in which:

Fig. 1 is a view in side elevation of a disc seeder of well known type, attached to the draw bar of which is the spring gage rod.

Fig. 2 is a top plan view of Fig. 1;

Fig. 3 is a side elevational view of the spring gage removed from the seeder and showing in dotted lines the adjustment of the gage.

Fig. 4 is a top plan view of the spring gage and its supporting bracket.

Referring specifically to the drawings in which like numerals indicate similar parts throughout the various views, the seeder comprises forked draw bars 6 and 7, being attached as by rivets or bolts 9 to a plate member 10, said plate member 10 carrying the seed spout 11 terminating in a shoe part 12. The plate 10 includes a bracket 13 for supporting an axle 14 on which is freely rotatably mounted a disc 15. The foregoing are all parts of a known and usually constructed disc seeder or grain drill.

The spring gage attachment is indicated at 16 and comprises a spring strap or rod being slightly curved upwardly at its rear end 17 and converging into its upper portion 18 which is struck on the radius of a circle. A block 19 has a groove 20 which receives the portion 18 of the spring gage, said groove being of a depth slightly less than the thickness of the spring rod 18, whereby the spring rod 18 can be clamped in various adjustments as by a clamping member 21, said member being of V-shaped and having openings 22, 23 and 24, which openings register with openings in the block 19 when the clamp is in assembled position. A plurality of bolts 25 and nuts 26 are adapted to be positioned in the respective holes in the clamp member 21 and block 19 to clamp the spring gage in any desired adjusted position.

The clamping means for the spring gage is mounted to one of the forked draw bars 7, and as best seen by referring to Fig. 1 it will be seen that the draw bar 7 passes longitudinally between the back or grooved plate 19 which carries the spring gage 16 and also between the V-shaped clamp. Thus, when in this position by tightening the bolts and nuts 24 and 25 the gage spring rod is clamped in its desired position to the draw bar of the seeder.

Of course, it will be readily understood, that by loosening the holding bolts and nuts, that the spring gage 16 can be varied to that its trailing end 17 will take different elevated positions with respect to the ground level, and thereby vary the distance of the disc and seeder shoe with respect to its amount of entry into the ground.

It is of course contemplated that a plurality of such disc seeders will be used as is usual in the art, and that the spring gage rods which are attached to each disc seeder, will provide a gage means to determine how far the discs can enter the ground.

The gage bar has the advantage of knocking down the stubble just prior to the seeding operation and it will be seen that the gage rod rides just above or on the ground in a position substantially by the side of the seeder shoe to hold the stubble and weeds down during the seeding operation and thereby prevents the vegetation from fouling the seeder tip and its planting operation. It will also be noted that each individual disc seeder is mounted to ride on its respective spring and therefore controls the depth to which the disc may go into the ground, thus producing an even depth planting of the seed, which seed will all therefore germinate about the same time and thus produce a crop of substantial uniformity.

It will be clear from the above that the spring gage rides just clear of the ground until the disc strikes soil that is soft and tries to bury too deep, then the spring will hold it to the specified depth to which it is adjusted.

It is not intended that the invention be limited to the exact construction shown, and while the attachment is shown only in connection with a disc seeder, it is within the scope of the invention that such a gage as disclosed in the invention could readily be attached to various types of grain drills or any other types of planting machinery.

The invention is not limited to the exact construction shown, but is capable of variation within the scope of the following claim.

I claim:

An attachment for the draw bar of a disc seeder, comprising a spring steel gage runner having its forward end curved on a circular radius, a clamping member adapted to receive the forward curved end of the gage runner, said clamping member comprising a rectangular block having a curved groove in one face thereof which groove receives the forward curved end of the gage, the groove being of a depth slightly less than the thickness of the gage runner, and a V-shaped holding member having spaced openings therein, the clamping block having openings registering with the openings in the V-shaped holder, and fastening members engaging the clamping block and V-shaped holder to draw the latter into clamping position to hold the gage runner in adjusted position on the draw bar of the seeder.

JOSEPH GREAVES.

REFERENCES CITED

The following references are of record in the file of this patent:

UNITED STATES PATENTS

| Number | Name | Date |
|---|---|---|
| 125,216 | Paddock | Apr. 2, 1872 |
| 495,317 | Eisenhart | Apr. 11, 1893 |
| 610,316 | Arnett | Sept. 6, 1898 |
| 1,028,353 | Hansen | June 4, 1912 |
| 1,261,150 | Mountjoy | Apr. 2, 1918 |
| 1,695,608 | Ressequie | Dec. 18, 1928 |
| 1,747,525 | Nagy | Feb. 18, 1930 |
| 2,075,301 | Pipenhagen | Mar. 30, 1937 |